United States Patent
Lamberti (10) Patent No.: US 6,541,721 B1
(45) Date of Patent: Apr. 1, 2003

(54) ELECTRICAL SWITCH FOR GAS COCKS

(75) Inventor: Silvano Lamberti, Gussago (IT)

(73) Assignee: BSPARKS S.p.A., Roncadelle (IT)

( * ) Notice: Subject to any disclaimer, the term of this patent is extended or adjusted under 35 U.S.C. 154(b) by 0 days.

(21) Appl. No.: 09/762,447

(22) PCT Filed: Jun. 23, 2000

(86) PCT No.: PCT/EP00/05833

§ 371 (c)(1), (2), (4) Date: Mar. 5, 2001

(87) PCT Pub. No.: WO01/02776

PCT Pub. Date: Jan. 11, 2001

(30) Foreign Application Priority Data

Jul. 2, 1999 (IT) ......................................... BS990058 U (51) Int. Cl.[7] ................................................. H01H 9/06
(52) U.S. Cl. .................. 200/61.86; 200/61.6; 200/506; 431/256
(58) Field of Search .............................. 200/506, 61.19, 200/61.58 R, 61.6, 61.85, 61.86, 566; 431/47, 254–7

(56) References Cited

U.S. PATENT DOCUMENTS

| | | | | |
|---|---|---|---|---|
| 2,753,413 A | * | 7/1956 | Anderson | ................... 200/506 |
| 3,346,710 A | * | 10/1967 | Weston et al. | .......... 200/506 X |
| 3,971,904 A | | 7/1976 | Ward | |
| 4,249,047 A | * | 2/1981 | Huff et al. | ................ 200/61.86 |
| 4,609,795 A | * | 9/1986 | Lavigne et al. | .......... 200/61.19 |
| 5,525,771 A | | 6/1996 | Lund | |

FOREIGN PATENT DOCUMENTS

EP          0902238 A       3/1999

* cited by examiner

*Primary Examiner*—Renee Luebke
(74) *Attorney, Agent, or Firm*—Gibbons, Del Deo, Dolan, Griffinger & Vecchione (57) ABSTRACT

A gas-burner electrical switch, which may be associated with a gas-supply cock. The gas-supply cock has a maneuvering stem (14) that is free to slide and turn about its own axis within the cock body (13) to control gas supply. The electrical switch includes a shell (15) that can be fixed to the cock body (13), and that encloses a first contact (16) that may be associated to a second contact (17) to close or to open an electrical circuit of the lighter. The switch includes a control rod (31), which is free to slide within the shell (15) and is constrained to the stem (14) in such a way as to translate with the stem (14) in both directions of sliding of the stem (14), but without being forced to rotate with the stem (14). The control rod (31) sets the two contacts (16, 17) in electrical connection at a point corresponding to at least one position of the stem (14). The two contacts (16, 17) are otherwise separate from one another.

9 Claims, 6 Drawing Sheets

ELECTRICAL SWITCH FOR GAS COCKS

FIELD OF THE INVENTION

The present invention relates to an electrical switch for gas-burner lighters that can be associated to the body of a gas-supply cock.

In recent embodiments of cooking stoves with gas burners, it is known that an electrically operated gas-lighter, for example of the spark or incandescence type, can be associated to each burner, the gas lighter being operated by the user at the same time as he operates the gas-supply cock of the chosen burner.

BACKGROUND OF THE INVENTION

The supply cock is in fact controlled by a maneuvering stem, which, being constrained in such a way that it is free to slide and turn along and about its own axis with respect to the body of the cock, enables supply of the amount of gas desired by the user when it is pressed against the body of the cock and rotated with respect to the latter.

The electrical circuit of the gas-lighter is then connected to a switch which is, in turn, operatively connected to the] maneuvering stem of the supply cock, in such a way that the pressure exerted by the user on the stem to deliver the gas involves closing of the switch, and the simultaneous operation of the lighter, whilst release of the [said] stem involves opening of the switch.

Such switches for gas-burner lighters are generally made up of a box-like shell that is connected to the cock body, two electrical contacts set at a distance apart and belonging to the circuit of the lighter, and a mobile body for closing the circuit, which, being constrained in such a way that it is free to slide in the shell, can be pushed by the maneuvering stem of the cock itself.

In a particular known switch, both the shell, which is engageable with the body of the cock, and the mobile body, which is translatable with respect to the shell, have a circular hole within which, during assembly, is inserted the maneuvering stem of the cock. Furthermore, within the shell, the two electrical contacts, appropriately shaped, are set one above the other and at a distance apart from one another in the case unless they are subjected to an external force. When pressed for gas supply, the maneuvering stem, induces, by means of a contrasting element, a displacement of the mobile body towards the inside of the shell, in such a way that the mobile body in turn pushes, by deforming it elastically, one of the two electrical contacts against the other to close the circuit of the lighter. When the maneuvering stem is instead released, one or more return springs, acting on the mobile body within the shell, push the [said] mobile body to return to its initial position, thus opening the circuit.

Although the switch is simple to assemble on the stem, it requires the presence of elastic means for return of the mobile body into its initial position, for the purpose of enabling opening of the circuit. This involves a certain constructional complexity of the switch and can lead to the malfunctioning of the switch itself when the springs, on account of possible permanent set due to use, are no longer able to perform their return function correctly.

In addition, the arrangement and mutual connection of the two contacts, on account of elastic deformation of one of these when subjected to the force of the mobile body, can produce, over time, a lasting deformation that keeps the two contacts permanently connected, and hence the circuit of the lighter closed.

In another known embodiment, the switch comprises an external shell that is fixed to the body of the supply cock, and a control rod, i.e., a mobile body, that is free to slide within the external shell. The control rod has one end that can be pressed by a knob or collar that is integral with the maneuvering stem of the supply cock, whilst the other end is provided with an electrically conducting element. Inside the shell the electrical contacts are separated from one another, and closing of the circuit of the lighter occurs when, following upon translation of the control rod, the conducting element of the control rod engages with the two electrical contacts. When the maneuvering stem is released, elastic means anchored within the shell push the control rod into its initial position, thus interrupting the connection between the contacts, and hence opening the circuit of the lighter.

Also in this type of switch, the presence of the return springs leads to problems regarding the constructional complexity and to the operation of the switch which deteriorates over time; i. e., problems that are similar to the problems referred to in the embodiment described previously.

In addition, the arrangement of the control rod within the external shell must be particularly precise dimensionally to prevent possible misalignments between the end portion of the rod provided with the electrical conductor and the two separated contacts. Such a misalignment could lead to the impossibility of connecting the contacts together, and thus closing the circuit of the lighter.

DISCLOSURE OF THE INVENTION

One purpose of the present invention is to solve the problems existing in the known art by providing an electrical switch for a gas-burner lighter that is simple to make and that proves reliable and effective also given a high frequency of use.

A further purpose of the present invention is to provide a switch for gas-burner lighters that is compact, simple to install, and that does not involve particular constructional precautions to prevent misalignments between the parts.

The electrical switch of a lighter for gas burners, according to the present invention, may be associated to a gas-supply cock of the type comprising a maneuvering stem that is free to slide and turn about its own axis within the body of the cock to control gas supply.

The switch comprises an external shell that can be fixed to the body of the cock, which in turn encloses a first contact and a second contact that may be connected together to close or to open the electrical circuit of the lighter. The switch is likewise provided with a control rod, which is free to slide within the shell, and is constrained to the maneuvering stem in such a way as to translate, but not to rotate, in an integral way with the stem, in the two directions of translation of the stem itself. The control rod is able to set the two contacts in electrical connection in correspondence to at least one position of the stem, whilst the two contacts are otherwise separate from one another.

According to a preferred aspect of the present invention, at least one of the two contacts is pushed in closing against the other contact, and the control rod comprises an insulating portion that can be set between the two electrical contacts to interrupt the circuit of the lighter in correspondence to one or more positions of the maneuvering stem.

According to a further aspect of the present invention, the control rod comprises both an insulating portion, and a portion for closing the contacts, which can alternatively be set between the contacts themselves to open or to close the circuit of the lighter, according to the position assumed by the maneuvering stem.

According to a further aspect of the invention, one of the contacts of the switch is elastically connected in closing to the other contact, and the closing portion of the control rod comprises a connecting window for the aforesaid contacts.

BRIEF DESCRIPTION OF THE DRAWINGS

A preferred embodiment of the present invention will now be described, purely to provide an example, with the aid of the attached figures, in which:

FIGS. 9a–9d illustrate respectively an overall perspective view of an assembled switch of the invention, a perspective view of an alternative contact, a perspective view of a further alternative contact, and a perspective view of a control rod of the assembled switch of FIG. 9a.

MODES OF CARRYING OUT THE INVENTION

With reference to the drawings, the gas cock is designated by 11 and the electrical switch by 12. A part of the body 13 of the gas cock is represented, in which a maneuvering stem 14 is guided, which can perform an axial motion and a rotary motion with respect to its own axis, and is designed to control a shutter (not represented) for opening/closing gas supply to a burner.

The switch 12 in turn comprises a shell 15 fixed directly to the body 13 of the cock 11, on one side of the latter, In the vicinity of the maneuvering stem 14 of the cock, and a control rod 31 constrained to the shell 15 in such a way that it is free to slide within the same shell 15.

Preferentially, the shell 15 of the switch, which is box-shaped, comprises snap-action means shaped so as to close elastically and fix the shell 15 itself of the switch to the body 13 of the cock. However, means of a different nature may be used, which in any case enable the shell 15 to be fixed firmly to the body 13.

The control rod 31, as will be specified in detail in what follows, is constrained in such a way as to translate, in both directions of sliding, in an integral way with the maneuvering stem 14 of the gas cock.

In the shell 15 of the switch are housed a first contact 16 and a second contact 17, which may be matched together, and each of which is connected to respective electrical conductor 18,19 belonging to an electrical circuit that supplies a lighter for gas burners.

The above lighter (non represented) may, for example, be of the spark or incandescence type. In the embodiment illustrated to provide an example, the shell of the switch 15 consists of a first element 20 and a second element 21, made of insulating plastic material, the two elements being complementary and appropriately shaped to snap together to form the shell 15.

In particular, the first element 20 has a C-shaped elastic portion 22, by means of which it embraces the cock body 13 to fix to the latter, and in addition has a lug 23 which, engaging in a corresponding notch 24 provided in the cock body 13, prevents movements of relative translation or rotation between the body 13 and the element 20. The second element 21 is fixed to the first element 20, to form the shell 15, by means of the snap-action coupling teeth 25. The internal shape of the elements 20,21 is such as to define a seat 26 in which the electrical contacts 16,17 are mounted and held in position. More in particular, the electrical contacts 16,17 are fixed, respectively, within the seats 27,28 of the shell 15, so enabling their electrical connection with the conducting terminals of the circuit of the lighter.

According to the embodiment illustrated in the figures, one of the contacts 16 comprises an elastic tab 16' that can be associated to the contact 17, the elastic tab 16' being, in its end portion, mobile with respect to the contact 17 to enable closing or opening of the circuit of the lighter. The tab 16' is shaped and set within the shell 15 in such a way that it is pushed in closing, by its own elasticity, towards the other contact 17.

In alternative embodiments, not illustrated, the contact 16 could be elastically connected to the contact 17, by means of, for example, a retaining spring.

Figures 3, 4, 5, 8:
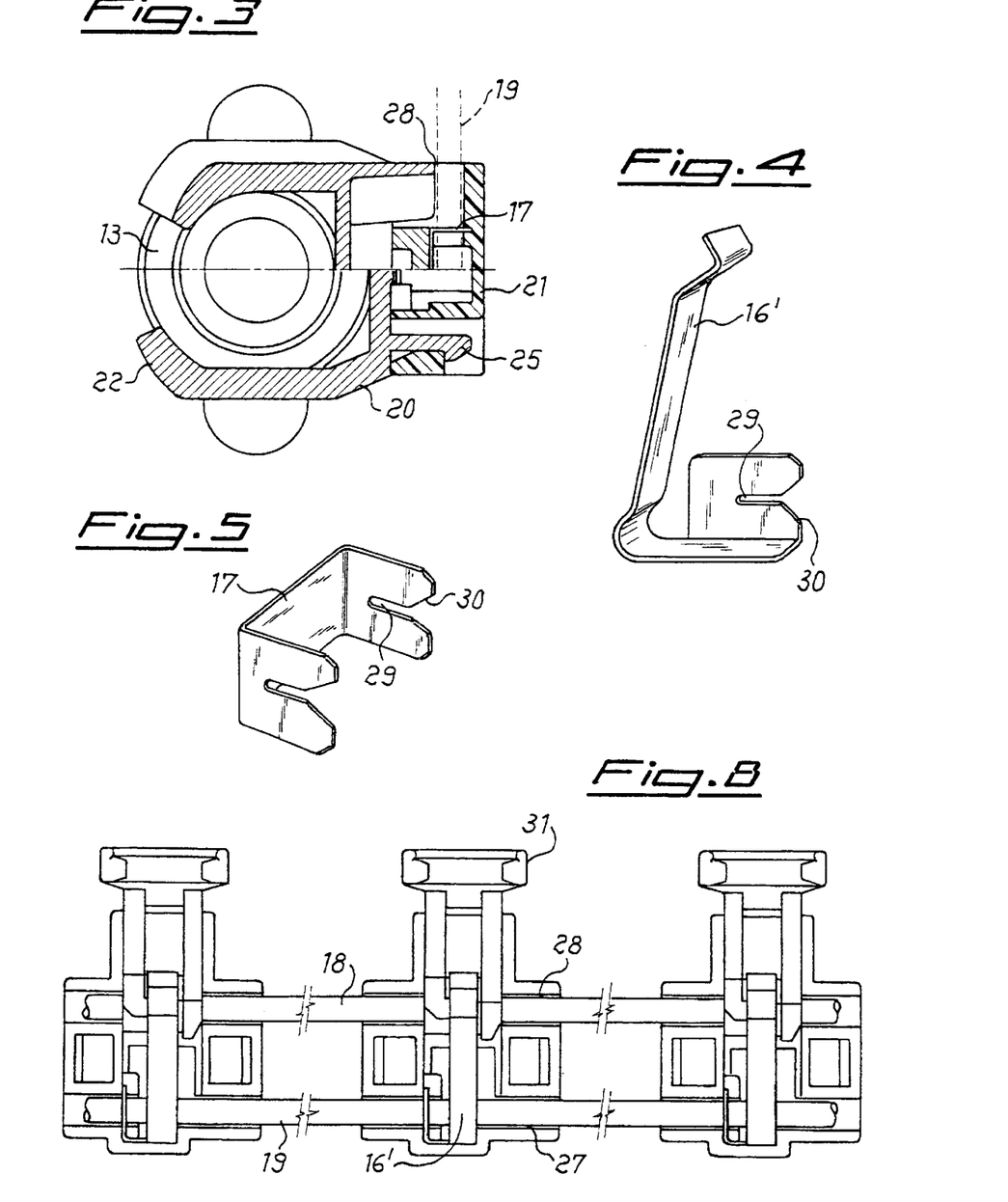
FIG. 3 illustrates a transverse cross section of the ensemble of FIG. 1.
FIGS. 4 and 5 illustrate, respectively, detailed views of a mobile contact and of a fixed contact of the switch.
FIG. 8 illustrates the connection of a number of switches in series, for as many gas cocks of a cooking stove.

Each of the two contacts 16,17 has a plate-like portion (FIGS. 4 and 5) provided with a notch 29 splayed at its entrance 30 for the respective electrical conductor of the circuit of the lighter. The notches 29 of the contacts 16,17, made with a suitably reduced thickness, enable fast wiring up of the switch without any need to peel part of the conductors beforehand. In fact, before snap-closing together the two elements 20 and 21 that define the shell 15, each conductor coming out of the circuit supplying the lighter is inserted, by force, within the respective notch 29, to cause cutting of the sheath of the conductor itself and hence the electrical connection between the conductor and the contact. The subsequent snap-closing of the two elements 20, 21 keeps the conductors 18,19 and the contacts 16, 17 in position.

The switch is operated by the control rod 31, which is free to slide within the shell 15 and which is constrained in such a way as to translate, in both the directions of sliding of the maneuvering stem 14, fixedly with the] maneuvering stem 14 itself, without thereby being forced to rotate with the latter. The maneuvering stem 14 of the gas cock, in fact, in order to enable supply of a desired amount of gas to the corresponding burner, must be pushed and rotated with respect to the body of the burner 13 by the user.

To ensure the constraint of translation of the rod 31 fixedly with the stem 14, according to a particular aspect of the present invention, an end portion of the rod 31 is provided with a C-shaped ring for closing 33, which is elustically deformable and engages in snap fashion within an appropriate groove made on the lateral surface of the stem 14, in such a way that the rod 31 can slide fixedly with respect to the stem 14 itself, but must not rotate with it.

The control rod 31 has a shaped arm which engages, thanks to an appropriate opening, within the shell 15 and which is free to slide in the seat 26 in an area corresponding to the portions of connection of the two contacts 16,17. The shaped arm, more in particular, is set between the two contacts 16,17, in correspondence to their connectable portions.

The shaped arm further has a window or closing portion 34 for closing the contacts 16, 17, consisting of a window of appropriate size that enables the two contacts 16,17 to come into contact with one another, and a portion 32 made of insulating material.

When, owing to the displacement of the maneuvering stem 14 of the cock, the control rod 31 is translated axially, the shaped arm displaces with respect to the two contacts 16,17, in such a way as to present to the coupleable portions of the two contacts 16,17, respectively the [portion for] closing portion 34 and the insulating portion 32. Thanks to the elastic characteristics of the tab 16' of the contact 16, when the [portion for] closing portion 34 is set between the two contacts 16,17 in correspondence to their matching portions, the tab 16' is pushed in closing against the contact 17 by its own elasticity and thus effects closing of the circuit of the lighter. When, instead, the insulating portion 32 of the rod 31 is set between the contacts 16,17 to interrupt the connection, the tab 16' is elastically deformed, for a limited stretch corresponding to the thickness of the shaped arm, so being withheld against the insulating portion 32 itself.

The elastic deformation of the tab 16' is particularly reduced because the insulating portion 32 that is set between the two connecting ends of the contacts 16 and 17 can have an extremely limited thickness.

According to an alternative embodiment, the closing portion 34 of the rod 31 can consist of an element 34A made of electrically conductive material that ensures connection of the contacts 16,17, when it is set between the latter.

In the cock-closed position, and thus with the burner turned off, the maneuvering stem 14 is in a retracted position (i. e., towards the outside of the cock body 13), and the control rod 31 of the switch 12 is set with its insulating portion 32 between the flexible tab 16' and the contact 17. In this case, since the electrical connection between the two contacts 16 and 17 is not made, the circuit of the lighter is open (see FIG. 1).

For opening of the cock 11 and passage of the gas to the burner, the maneuvering stem 14 is, in succession, displaced axially forwards and rotated with respect to its own axis. With axial displacement of the stem 1, thanks to the constraint of sliding in the two directions that exists between the rod 31 and the stem 14, the control rod 31 of the switch is simultaneously pushed within the shell 15 of the switch, until the closing portion or window 34 assumes a position corresponding to the portions of connection of the tab 16' and of the contact 17.

Figure 2:
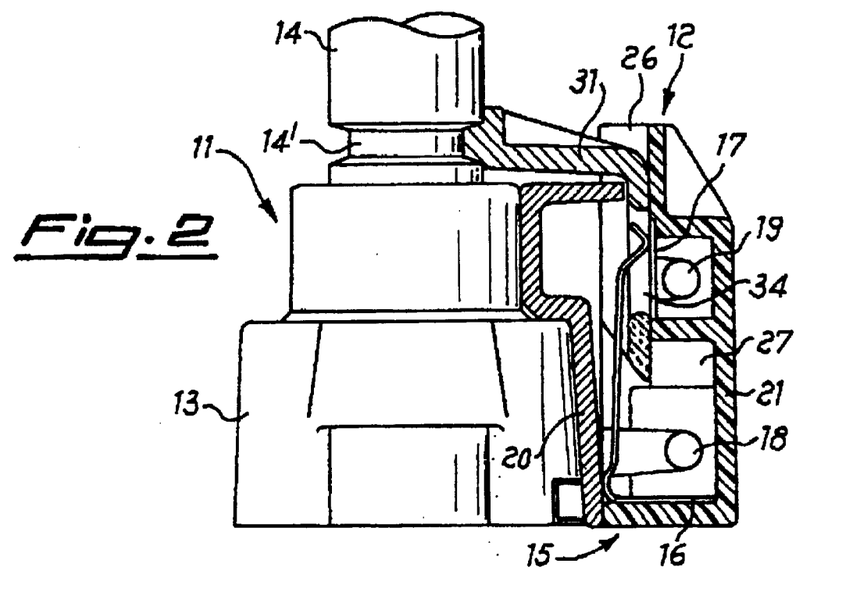
FIG. 2 illustrates a view like that of FIG. 1 but with the switch closed.

Thus, the tab 16' of the contact 16 can come to rest on the contact 17, so closing the electrical circuit supplying the lighter, as illustrated in the FIG. 2. Further rotation of the stem, which is kept pressed against the cock body 13, causes gas delivery from the cock to the burner, where the gas encounters the sparks produced by the electric lighter, which start the combustion.

Rotation of the maneuvering stem 14 of the cock does not cause any rotation of the control rod 31.

When the combustion becomes stable, the maneuvering stem 14 is released, and, thanks to appropriate elastic means commonly provided in the making of cocks for gas burners, it returns substantially to the initial position, or to an intermediate position which enables regulation of gas flow by means of rotation of the stem 14 itself, without this causing interruption of the flow of the gas.

Release and consequent axial translation of the stem 14, in a direction opposite to the direction in which it was pushed initial, causes translation of the control rod 31 in a direction opposite to the initial direction. This latter translation, in turn, brings about displacement of the insulating portion 32 in correspondence to the contacts 16,17, and hence interposition of the] portion 32 between the connection ends of the two contacts 16,17 to interrupt the circuit of the lighter.

No elastic element or spring is required for returning the control rod 31 to its original, circuit-open position, since the latter is constrained in both directions of axial translation to the maneuvering stem 14 for controlling the gas-supply cock. This solution, which exploits the presence of the elastic return means of the maneuvering stem 14, enables simplification of construction of the switch, which does not require return springs for return of the rod 31 and seats for the springs, at the same time making the switch more reliable because there is no risk that the rod 31 will remain permanently in the position corresponding to closing of the electrical circuit.

In addition, opening and closing of the contacts 16,17, obtained by interposition of the control rod 31 that is provided with a portion for closing the circuit, does not pose particular problems to the construction of the switch as regards the possible misalignment of the parts to be fitted together. The fact that the rod 31 is set between the connecting ends of the contacts 16,17 so that it is free to slide enables, in addition, elimination of possible oxides that might form on the [said] contacts 16,17.

Figure 1:
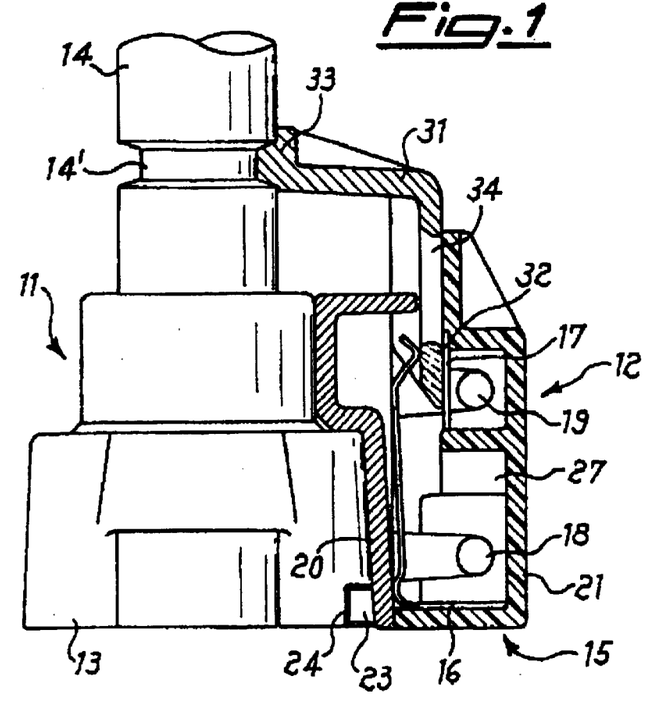
FIG. 1 illustrates part of the body of a cock and, in cross section, a switch applied to the cock in the circuit-open position.

Finally, when the cock is closed, the initial position, corresponding to the one illustrated in FIG. 1, is resumed.

Figure 9A:
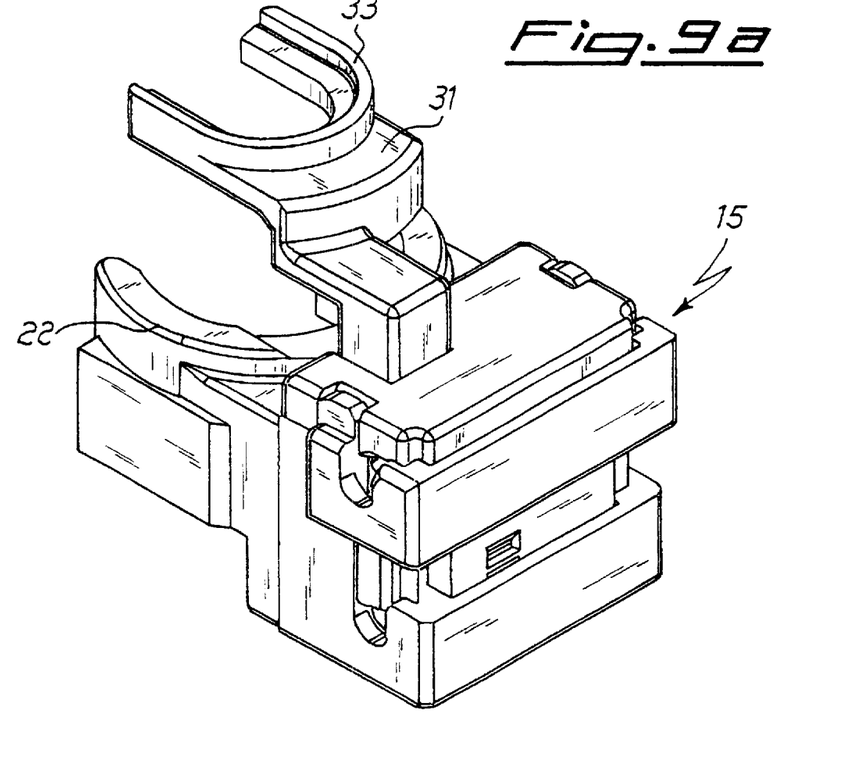
Figure 9B:
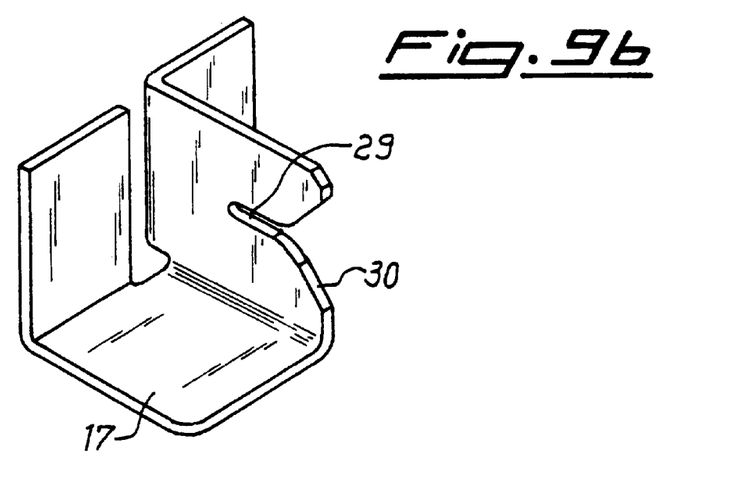
Figure 9C:
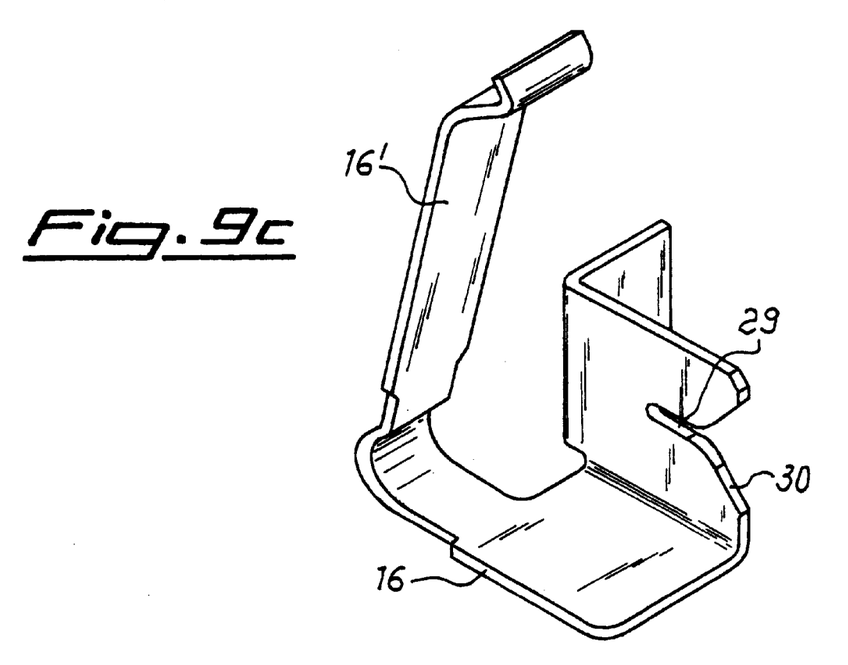
Figure 9D:
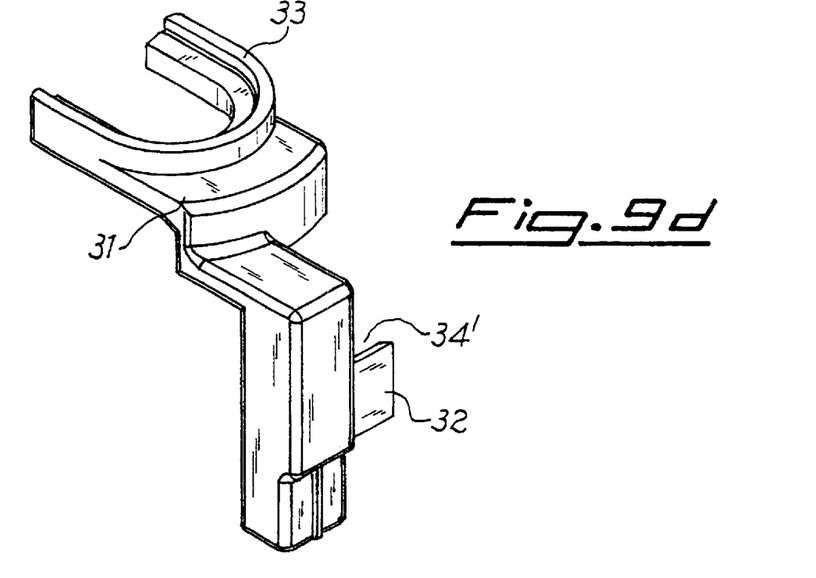
Figure 10:
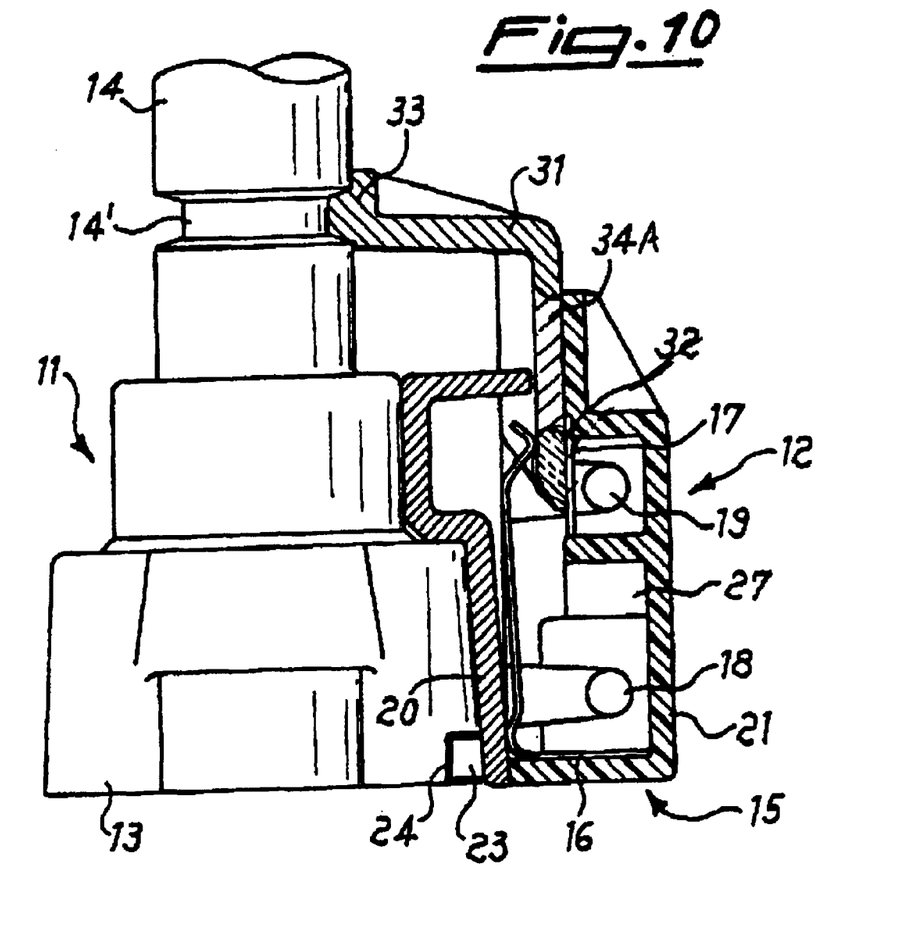
FIG. 10 illustrates part of the body of a cock and, in cross-section, a switch applied to the cock in the circuit-open position in accordance with an alternative embodiment.

FIGS. 9a–9d illustrate a further embodiment of the present invention, in which reference numbers that are the same as those of FIGS. 1–8 are used to indicate parts that are the same. In particular, FIG. 9a is an overall perspective view of the assembled switch, FIGS. 9b and 9c illustrate alternative embodiments of the contacts, and FIG. 9d is detailed view of the control rod 31 of the switch.

Figure 6:
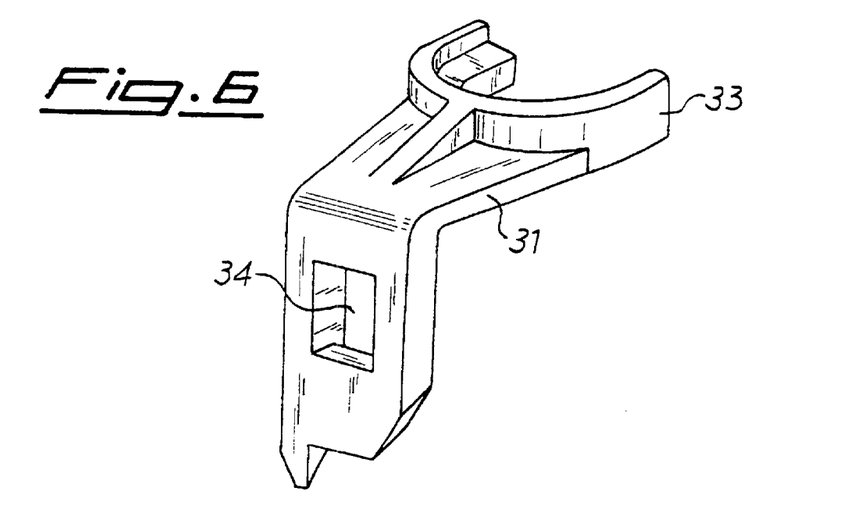
FIG. 6 illustrates a perspective view of a rod that is set between the stem of the cock and the switch for controlling the latter.
Figure 7:
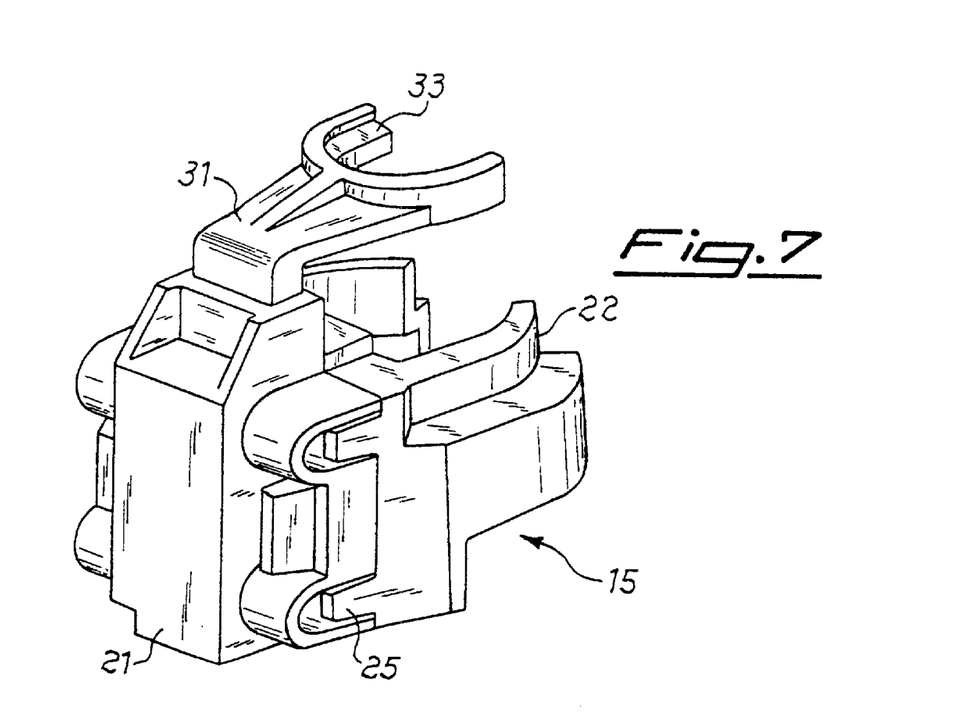
FIG. 7 Illustrates a perspective view of the components of the body of the switch and the control rod associated.

In particular, the control rod 31 of the switch represented in FIG. 9d has an insulating portion 32 which corresponds to a opening 34', that replaces, at the same time performing the same function, the window 34 of the embodiment illustrated in FIG. 6.

Consequently, as emerges clearly from the description, the use of a rod 31 that is integral, in both directions of translation, with the stem 14 of a gas cock to control a switch of an electric lighter for gas burners, enables simplification of the structure of the switch, at the same time increasing its reliability.

In addition, the particular technique used to enable or prevent connection of the contacts 16,17, i. e., via non-permanent interposition of insulating parts between the contacts 16,17, enables production of a switch that is efficient and that is practically free from problems of alignment of the parts.

What is claimed is:

1. A gas-burner lighter apparatus, comprising an electrical switch, and a maneuvering stem that is free to slide along and turn about its own axis within a cock body of a gas-supply cock to control gas supply, the electrical switch comprising a shell that is configured to be fixed to the cock body, a control rod that is free to slide within the shell, a first contact and a second contact each enclosed within the shell and arranged to close or open an electrical circuit of the gas-burner lighter, wherein the control rod is constrained to the maneuvering stem in such a way as to translate in an integral way with the latter in both directions of sliding of the maneuvering stem without thereby being forced to rotate with the maneuvering stem, the control rod being arranged to set in electrical connection the first and second contacts in correspondence with at least one position of the maneuvering stem, the first and second contacts being otherwise separate from one another.

2. An apparatus according to claim 1, wherein at least one of said first and second contacts is pushed in closing the other of said first and second contacts and in that said control rod comprises at least one insulating portion that can be set between the first and second contacts for interrupting, in one or more positions of the maneuvering stem the electrical circuit of the lighter.

3. An apparatus according to claim 1, wherein said control rod comprises at least one insulating portion and at least one portion for closing the contacts, said closing portion being set between said contacts when the maneuvering stem reaches at least one first position of gas supply, said contacts being otherwise separate from said insulating portion.

4. An apparatus according to claim 3, wherein at least one of said contacts is elastically coupled in closing to the other of said contacts, and in that said closing portion of the rod comprises at least one connecting window for said contacts.

5. An apparatus according to claim 3, wherein said closing portion comprises at least one conducting element.

6. An apparatus according to claim 1, further comprising snap-action fixing means integral with said rod to constrain said rod to said maneuvering stem in a way that said rod is free to turn but not free to slide with respect to said stem.

7. An apparatus according to claim 1, further comprising snap-action fixing means integral with said shell for fixing of the latter to said cock body.

8. An apparatus according to claim 1, wherein the shell comprises a first element provided with means of fixing to the cock body, and a second element complementary to the first element, said first and second elements being shaped to close together by snap action and presenting internally a shape for receiving said contacts and constraining said control rod in a sliding way.

9. A gas-burner lighter apparatus, comprising a gas-supply cock and electrical switch assembly that includes a gas cock having a maneuvering stem that is free to slide along and turn about its own axis within a cock body of a gas-supply cock to control gas supply, and an electrical switch comprising a shell that is configured to be fixed to the cock body, a control rod that is free to slide within the shell, a first contact and a second contact each enclosed within the shell and arranged to close or open an electrical circuit of the gas-burner lighter, wherein the control rod is constrained to the maneuvering stem in such a way as to translate in an integral way with the latter in both directions of sliding of the maneuvering stem without thereby being forced to rotate with the maneuvering stem, the control rod being arranged to set in electrical connection the first and second contacts in correspondence with at least one position of the maneuvering stem, the first and second contacts being otherwise separate from one another.

* * * * *